No. 786,508. PATENTED APR. 4, 1905.
C. MAUL.
DISK HARROW.
APPLICATION FILED JAN. 9, 1905.

Witnesses:

Inventor
C. Maul
by Wilhelm, Parker & Hauf
Attorneys

No. 786,508.

Patented April 4, 1905.

UNITED STATES PATENT OFFICE.

CHRISTIAN MAUL, OF BATAVIA, NEW YORK, ASSIGNOR TO THE JOHNSTON HARVESTER COMPANY, OF BATAVIA, NEW YORK.

DISK HARROW.

SPECIFICATION forming part of Letters Patent No. 786,508, dated April 4, 1905.

Application filed January 9, 1905. Serial No. 240,161.

*To all whom it may concern:*

Be it known that I, CHRISTIAN MAUL, a citizen of the United States, residing at Batavia, in the county of Genesee and State of New York, have invented a new and useful Improvement in Disk Harrows, of which the following is a specification.

This invention relates to the bearings in which the disk gangs of disk harrows and pulverizers are journaled, and has for its object to provide the bearings with a wear piece or block which is arranged to properly receive the working thrust of the disk gang and the wear resulting therefrom and relieves the other parts of the bearing from excessive wear.

Figure 1:
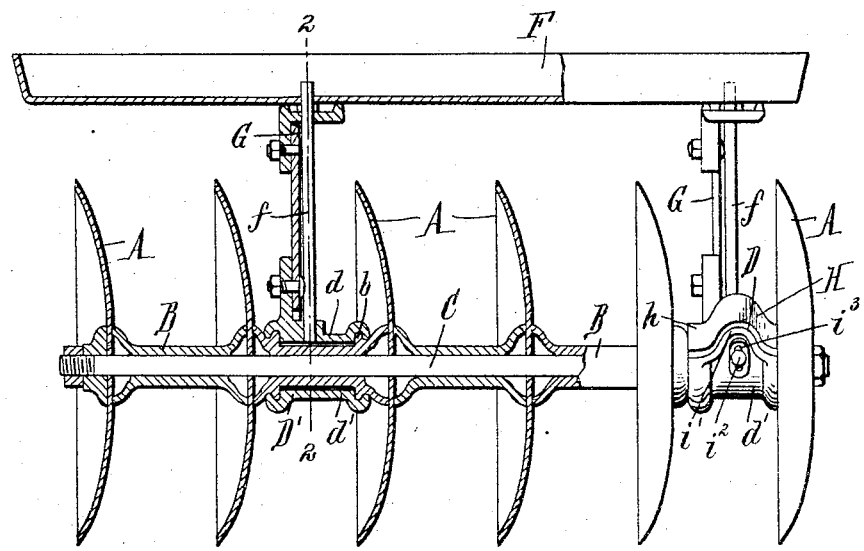
Figure 2:
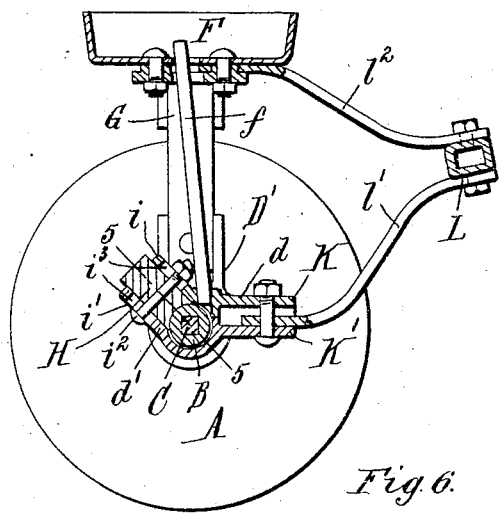
Figure 3:
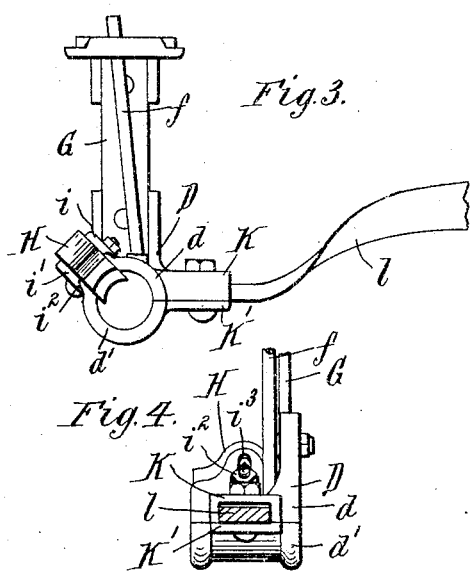
Figure 4:
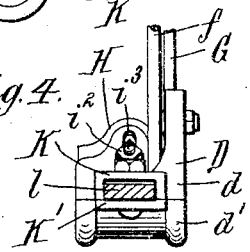
Figure 6:
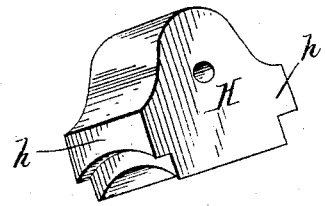
Figure 5:
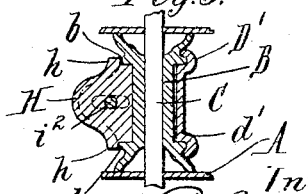

In the accompanying drawings, Figure 1 is a rear elevation, partly in section, of a disk gang provided with my improvement. Fig. 2 is a vertical section in line 2 2, Fig. 1. Fig. 3 is a side elevation of one of the bearings. Fig. 4 is a front elevation of the bearing. Fig. 5 is a section through the bearing in line 5 5, Fig. 2. Fig. 6 is a detached perspective view of the wear-block.

Like letters of reference refer to like parts in the several figures.

A represents the harrow or pulverizer disks, which may be of any suitable construction; B, the thimbles or tubular stay-sleeves, which are arranged between the disks, and C the shaft or rod which passes through the thimbles and disks and by which these parts are secured together in the usual manner.

D D' represent the bearings in which the gang is journaled and which are arranged, as usual, one near the inner end of the gang for connection with an adjusting mechanism and the other near the outer end for connection with the frame.

F represents the weight-box or gang-plank, which is arranged lengthwise over the gang and supported by standards G, rising from the bearings.

$f$ represents the usual oil-pipes extending from the bearings upwardly.

Each bearing is composed of a top portion $d$, a bottom portion $d'$, and a wear-block H, preferably of wood, which is arranged between these portions on the rear side of the bearing and extends upwardly and rearwardly from the bore or cavity of the bearing. The top and bottom portions $d\ d'$ of the bearing are provided with oblique rear lugs or ears $i\ i'$, respectively, which lugs extend upwardly and rearwardly. A bolt $i^2$, passing through these lugs and the block H, secures these parts together. The bolt-holes $i^3$, formed in the lugs $i\ i'$, are elongated to enable the block to be adjusted toward the thimble in order to compensate for the wear of the block. The wear-block is preferably provided at its ends with lateral extensions or projecting end portions $h$, which overhang and cover the annular ribs $b$ of the thimble B and protect this portion of the bearing to a certain extent against the entrance of dust or dirt.

The top and bottom portions $d\ d'$ of the bearing are provided with forwardly-projecting horizontal lugs or ears K K', respectively, for connection with the draft-rods $l\ l'$. The draft-rod $l$ connects the inner bearing D, as usual, with the adjusting device, (not shown,) and the draft-rod $l'$ connects the outer bearing D', as usual, with the cross-piece L of the main frame, which latter is further connected, as usual, with the weight-box by a rod $l^2$.

The working thrust of the disk gang and the wear resulting therefrom are exerted in the oblique rearwardly-ascending direction in which the wear-block is arranged. The latter therefore receives the bulk of the wear and relieves the other parts of the box therefrom. As the block wears away it is adjusted downwardly and forwardly until worn out, when it is replaced by a new one, which involves little expense when the block is made of wood. The arrangement of the wear-block in an oblique position coinciding with the oblique line of thrust enables the block to receive the thrust and wear most advantageously, whereby the disintegration of the wood is avoided, a smooth wearing-surface is maintained, and the life of the block and bearing is extended. The block is preferably so cut that the wear is received on the ends of the wood fibers.

I claim as my invention—

1. The combination of a disk gang and a journal-bearing for the same having in its rear portion a wear-block which is arranged in a rearwardly-ascending position, substantially as set forth.

2. The combination of a disk gang and a journal-bearing for the same having rearwardly-ascending rear lugs, an oblique wear-block arranged between said lugs, horizontal front lugs, and a draft-rod attached thereto, substantially as set forth.

3. The combination of a disk gang and a journal-bearing for the same having rearwardly-ascending rear lugs, an oblique wear-block arranged between said lugs, means for adjusting said block forwardly and downwardly, horizontal front lugs, and a draft-rod attached thereto, substantially as set forth.

4. The combination of a disk gang having a thimble provided with annular ribs, and a journal-bearing for said thimble having in its rear portion a rearwardly-ascending wear-block which is provided with lateral extensions projecting over said ribs, substantially as set forth.

Witness my hand this 5th day of January, 1905.

CHRISTIAN MAUL.

Witnesses:
 FRANK E. HOWE,
 G. A. FARRALL.